(12) United States Patent
Qi et al.

(10) Patent No.: US 10,115,522 B2
(45) Date of Patent: Oct. 30, 2018

(54) MULTI-LAYERED DIELECTRIC POLYMER MATERIAL, CAPACITOR, USE OF THE MATERIAL AND FORMATION METHOD THEREOF

(71) Applicant: ABB Schweiz AG, Baden (CH)

(72) Inventors: Lejun Qi, Beijing (CN); Nan Li, Beijing (CN); Delun Meng, Beijing (CN); Sari Laihonen, Västerås (SE); Francois Delince, Biesme (BE)

(73) Assignee: ABB Schweiz AG, Baden (CH)

( * ) Notice: Subject to any disclaimer, the term of this patent is extended or adjusted under 35 U.S.C. 154(b) by 149 days.

(21) Appl. No.: 15/166,022

(22) Filed: May 26, 2016

(65) Prior Publication Data

US 2016/0276105 A1    Sep. 22, 2016

Related U.S. Application Data

(63) Continuation of application No. PCT/CN2013/088393, filed on Dec. 3, 2013.

(51) Int. Cl.
*H01G 4/30* (2006.01)
*H01G 4/012* (2006.01)
(Continued)

(52) U.S. Cl.
CPC ........... *H01G 4/14* (2013.01); *B29C 47/0021* (2013.01); *B29C 47/0057* (2013.01);
(Continued)

(58) Field of Classification Search
CPC ........... H01G 4/30; H01G 4/012; H01G 4/33; H01G 4/14; B32B 27/281; B32B 27/06
(Continued)

(56) References Cited

U.S. PATENT DOCUMENTS

2005/0186437 A1    8/2005    Pramanik
2008/0182115 A1    7/2008    Briney et al.
(Continued)

FOREIGN PATENT DOCUMENTS

CN    1735508 A    2/2006
CN    101882507 A    11/2010
(Continued)

OTHER PUBLICATIONS

The State Intellectual Property Office, The P.R. China, International Search Report & Written Opinion Issued in corresponding Application No. PCT/CN2013/088393, dated Apr. 3, 2014, 13 pp.
(Continued)

*Primary Examiner* — Eric Thomas
*Assistant Examiner* — Arun Ramaswamy
(74) *Attorney, Agent, or Firm* — Taft Stettinius & Hollister LLP

(57) ABSTRACT

A multi-layered dielectric polymer material, a capacitor comprising the multi-layered dielectric polymer material, a use of the multi-layered dielectric polymer material and a method for forming the multi-layered dielectric polymer material are disclosed. The multi-layered dielectric polymer material may comprise a plurality of dielectric layers wherein the plurality of dielectric layers may comprise an identical base material. The base material may be compound with agents for at least one of the plurality of dielectric layers. It may overcome compatible issues for convention multi-layered material. The dielectric polymer material may have increased dielectric strength and excellent thermal properties.

18 Claims, 1 Drawing Sheet

(51) Int. Cl.

| | |
|---|---|
| *H01G 4/33* | (2006.01) |
| *H01G 4/14* | (2006.01) |
| *B32B 27/28* | (2006.01) |
| *B32B 27/06* | (2006.01) |
| *B29C 47/00* | (2006.01) |
| *B29C 47/06* | (2006.01) |
| *B29C 47/92* | (2006.01) |
| *B32B 27/08* | (2006.01) |
| *B32B 27/18* | (2006.01) |
| *B32B 27/20* | (2006.01) |
| *B32B 27/30* | (2006.01) |
| *B32B 27/32* | (2006.01) |
| *B32B 27/34* | (2006.01) |
| *B32B 27/36* | (2006.01) |
| *H01G 4/18* | (2006.01) |
| *H01G 13/00* | (2013.01) |

(52) U.S. Cl.
CPC ............ *B29C 47/065* (2013.01); *B29C 47/92* (2013.01); *B32B 27/06* (2013.01); *B32B 27/08* (2013.01); *B32B 27/18* (2013.01); *B32B 27/20* (2013.01); *B32B 27/28* (2013.01); *B32B 27/281* (2013.01); *B32B 27/285* (2013.01); *B32B 27/286* (2013.01); *B32B 27/302* (2013.01); *B32B 27/304* (2013.01); *B32B 27/32* (2013.01); *B32B 27/322* (2013.01); *B32B 27/34* (2013.01); *B32B 27/36* (2013.01); *B32B 27/365* (2013.01); *H01G 4/18* (2013.01); *H01G 4/306* (2013.01); *B29C 2947/92152* (2013.01); *B29C 2947/92647* (2013.01); *B29K 2995/0006* (2013.01); *B32B 2250/24* (2013.01); *B32B 2255/24* (2013.01); *B32B 2264/10* (2013.01); *B32B 2270/00* (2013.01); *B32B 2307/202* (2013.01); *B32B 2307/204* (2013.01); *B32B 2307/30* (2013.01); *B32B 2307/514* (2013.01); *B32B 2457/00* (2013.01); *B32B 2457/16* (2013.01); *B32B 2553/00* (2013.01); *H01G 13/00* (2013.01)

(58) Field of Classification Search
USPC .......................... 361/321.1, 301.4, 312, 323
See application file for complete search history.

(56) References Cited

U.S. PATENT DOCUMENTS

| | | | |
|---|---|---|---|
| 2009/0084487 A1* | 4/2009 | Iijima | ..................... H01G 4/30 156/89.12 |
| 2010/0172066 A1 | 7/2010 | Baer et al. | |
| 2011/0287243 A1 | 11/2011 | Carney et al. | |
| 2012/0292086 A1 | 11/2012 | Auman et al. | |
| 2014/0268493 A1 | 9/2014 | Nakatsuka et al. | |

FOREIGN PATENT DOCUMENTS

| | | |
|---|---|---|
| CN | 102049859 A | 5/2011 |
| CN | 102152579 A | 8/2011 |
| CN | 102225648 A | 10/2011 |
| JP | 2001129944 A | 5/2001 |
| WO | 2012144015 A1 | 10/2012 |

OTHER PUBLICATIONS

First Chinese Office Action, Chinese Patent Application No. 201380081333.5, dated Dec. 13, 2017, 16 pages.
Extended European Search Report, European Patent Application No. 13898497.6, dated Jun. 29, 2017, 13 pages.
Second Chinese Office Action, Chinese Patent Application No. 201380081333.5, dated Jul. 17, 2018, 21 pages including English translation.
Chinese Search Report, Chinese Patent Application No. 201380081333. 5, dated Jul. 17, 2018, 4 pages including English translation.

* cited by examiner

MULTI-LAYERED DIELECTRIC POLYMER MATERIAL, CAPACITOR, USE OF THE MATERIAL AND FORMATION METHOD THEREOF

TECHNICAL FIELD

The present invention relates to the field of dielectric materials, and more particularly, relates to a multi-layered dielectric polymer material, a capacitor comprising the multi-layered dielectric polymer material, use of the multi-layered dielectric polymer material and a method for forming the multi-layered dielectric polymer material.

BACKGROUND

Multi-layered polymer materials consisting of different polymers, or laminated films and sheets, are able to achieve combined properties that cannot be obtained from a single material while minimizing unwanted characteristics. Thus, this structure has been widely used for packaging application, by combining cheap and mechanically strong polymers (e.g. polypropylene (PP) or polyethylene (PE) with moisture or oxygen barrier polymer (e.g. EVOH).

Besides, in US patent application publication No. 20100172066A1, there is disclosed a multilayer polymer dielectric film comprising a first dielectric layer and a second dielectric layer which are coextruded. The first dielectric layer and the second dielectric layer comprise different polymer materials, one with high dielectric permittivity and the other with high dielectric strength. Under optimal condition, the coextruded laminate films composed of alternating layers with the two different polymer materials are able to provide dielectric strength higher than either of individual materials with combined dielectric permittivity. However, the manufacturing process for such a multilayer polymer dielectric film is limited by the compatibility of thermal and rheological properties between different polymers, which is challenging and particularly important for co-extrusion process. For instance, due to its low melting flow index, the electric insulation grade of PP is difficult to be coextruded with other widely used co-extruded materials such as polyamide and PET with relatively high melting flow index.

SUMMARY OF THE INVENTION

In view of the foregoing, the present invention has proposed a solution for improving the dielectric polymer material in the art so as to solve or at least partially mitigate at least a part of problems in the prior art.

Accordingly to a first aspect of the present disclosure, there is provided a multi-layered dielectric polymer material. The multi-layered dielectric polymer material may comprise a plurality of dielectric layers, wherein the plurality of dielectric layers comprises an identical base material. The multi-layered dielectric polymer material may be formed by co-extruding, or, in other word, the plurality of dielectric layers are coextruded together.

The multi-layered dielectric polymer material may comprise any number of dielectric layers; however, in an embodiment of the present disclosure, it comprises three or more dielectric layers. Examples of base material in the dielectric layers include polypropylene (PP); polyethylene (PE); crosslinked polyethylene (PEX); polyphenylene sulfide (PPS); polyamide (PA); maleic anhydride-modified polypropylene (PPgMA); polyethylene naphthalate (PEN) and isomers thereof such as 2,6-, 1,4-, 1,5-, 2,7-, and 2,3-polyethylene naphthalate; polyalkylene terephthalates such as polyethylene terephthalate (PET), polybutylene terephthalate (PBT), and poly-1,4-cyclohexanedimethylene terephthalate; polyimides such as polyacrylic imides; polyetherimides; styrenic polymers such as atactic, isotactic and syndiotactic polystyrene, α-methyl-polystyrene, para-methyl-polystyrene; polycarbonates such as bisphenol-A-polycarbonate (PC); poly(meth)acrylates such as poly (isobutyl methacrylate), poly(propyl methacrylate), poly (ethyl methacrylate), poly(methyl methacrylate), poly(butyl acrylate) and poly(methyl acrylate) (the term "(meth)acrylate" is used herein to denote acrylate or methacrylate); cellulose derivatives such as ethyl cellulose, cellulose acetate, cellulose propionate, cellulose acetate butyrate, and cellulose nitrate; polyalkylene polymers such as polyethylene, polypropylene, polybutylene, polyisobutylene, and poly (4-methyl)pentene; fluorinated polymers, such as perfluoroalkoxy resins, polytetrafluoroethylene, fluorinated ethylene-propylene copolymers, polyvinylidene fluoride, and polychlorotrifluoroethylene and copolymers thereof; chlorinated polymers such as polydichlorostyrene, polyvinylidene chloride and polyvinylchloride; polysulfones; polyethersulfones; polyacrylonitrile; polyamides; polyvinylacetate; polyether-amides. The base material can also be formed from copolymers such as, styrene-acrylonitrile copolymer (SAN), for example, containing between 10 and 50 wt %, preferably between 20 and 40 wt %, acrylonitrile, styrene-ethylene copolymer; and poly(ethylene-1,4-cyclohexylenedimethylene terephthalate) (PETG); cyanoethyl pullulan, cyanoethyl polyvinylalchohol, cyanoethyl hydroxyethyl cellulose, cyanoethyl cellulose or a combination thereof. Additional polymeric materials include block or graft copolymers.

To further improve the dielectric properties of the multi-layered dielectric polymer material, the base material may be compound with different additives, such as plasticizers, stabilizers, compatibilizers, and nucleating agents, for at least one of the plurality of dielectric layers.

The base material may be compounded with, for example, same nucleating agents, and it may also be compounded with different nucleating agents respectively, for at least two of the plurality of dielectric layers. Moreover, the base material may be compounded with different contents of nucleating agents respectively for at least two of the plurality of dielectric layers. The total amount of the nucleating agent may be ranging from about 0.14 wt % to about 5.0 wt %, preferably about 0.40 wt % to about 3.0 wt % and most preferably about 0.5 wt % to about 1.0 wt %, based on the total weight of the multi-layered dielectric polymer material.

In an embodiment of the present disclosure, the nucleating agents may comprise α-nucleating agent and β-nucleating agent. The weight ratio of the α-nucleating agent to the β-nucleating agent may be ranging from 4:1 to 1:4, preferably from 3:1 to 1:3 and most preferably 3:2 to 2:3. Moreover, the α-nucleating agent may be selected from the group consisting of sorbitol derivatives, organic phosphate derivatives or organic carboxylic acid salt compounds. The β-nucleating agent may be selected from the group consisting of organic pigments, aromatic amide compounds or group IIA metal salt compounds.

Besides nucleating agents, the base material may be compound with fillers to improve dielectric properties. Examples of fillers include short cut fibers, ceramic oxide particles, metal oxide particles, hydroxide particles, and layered mineral silicates.

In an embodiment of the present disclosure, the multi-layered dielectric polymer material may have an average breakdown strength of at least 540 V/μm, preferably at least 590 V/μm. The multi-layered dielectric polymer material may have an average thickness ranging from about 1 μm to 20 cm. The multi-layered dielectric polymer material may be in a form of a dielectric polymer film. The dielectric polymer film may have an average thickness ranging from about 1 to 30 μm, and preferably about 3 to 20 μm.

According to a second aspect of the present disclosure, there is provided a capacitor, the capacitor comprising a capacitor film composed of the multi-layered dielectric polymer material of any embodiment of the first aspect.

According to a third aspect of the present disclosure, there is also provided use of the multi-layered dielectric polymer material of any one of the first aspect in an electric equipment. In an embodiment of the present disclosure, the electric equipment may comprise any one of capacitors, power bushings, and power cables.

According to a fourth aspect of the present disclosure, there is further provided a method for forming a multi-layered dielectric polymer material of the first aspect. The method may comprise feeding identical base materials from a plurality of orifices in a die for co-extrusion; and co-extruding the base materials into a laminar sheet, wherein the laminar sheet comprising a plurality of dielectric layers of the identical base material. In an embodiment of the present disclosure, the method may further comprise stretching the coextruded laminar sheet into a thin film; and stretching the thin film in both a machine direction and a transverse direction in a simultaneous stretching mode. The coextruded laminar sheet may have a thickness of at least 100 microns. The thin film may have an initial thickness of at least 20 microns; and the stretching in the simultaneous stretching mode may be performed with a drawing ratio in machine direction of greater than 1.5, and more preferably greater than 3.0, and a drawing ratio in transverse direction of greater than 1.5, and more preferably greater than 3.0. In another embodiment of the present disclosure, the method may further comprise compounding the base materials with nucleating agents before feeding the base material.

With embodiments of the present disclosure, it may overcome compatible issues for convention multi-layered material and the statistical probability to have a defect throughout the dielectric polymer material may be reduced, and at the same time, the dielectric polymer material may have increased dielectric strength and excellent thermal properties.

BRIEF DESCRIPTION OF THE DRAWINGS

The above and other features of the present invention will become more apparent through detailed explanation on the embodiments as illustrated in the embodiments with reference to the accompanying drawings. Like reference numbers represent same or similar components throughout the accompanying drawings of the present invention, wherein.

DETAILED DESCRIPTION OF EMBODIMENTS

Hereinafter, a new multi-layered dielectric polymer material as provided in the present invention will be described in detail through embodiments and examples with reference to the accompanying drawings. It should be understood that these embodiments and examples are presented only to enable those skilled in the art to better understand and implement the present invention, not intend for limiting the scope of the present invention in any manner. Additionally, it should be also noted that the wording "a/an" as used herein does not exclude a plurality of such steps, units, devices, and objects, and etc.

Figure 1:
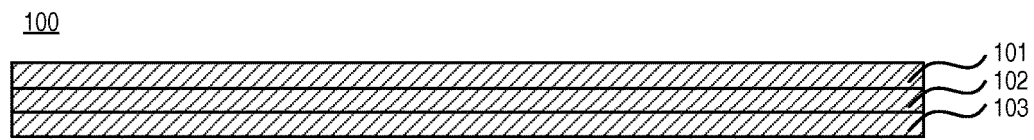
FIG. 1 schematically illustrates a multi-layered dielectric polymer material according to an embodiment of the present disclosure.

As mentioned above, in the present invention, there is proposed a multi-layered dielectric polymer material, which will be described with reference to FIG. 1. As illustrated in FIG. 1, the multi-layered dielectric polymer 100 comprises a plurality of dielectric layers 101, 102, 103. However, completely different from conventional multi-layered materials/structures, in the proposed multi-layered dielectric polymer material, all of the dielectric layers 101, 102, 103 comprise an exactly same base material It is know that in most of multiplayer structures, different materials are multi-layered together so as to benefit from different materials and the layered structures. Therefore, the conventional multi-layered dielectric material may combine the advantageous of all different materials so as to have both a good dielectric property and a high dielectric strength while possessing a lower statistic probability to have a fault throughout the materials. However, usually, the resin compatibility coupled with appropriate hardware choices is challenging and particularly important to co-extrude laminar structures with two or more different materials. Moreover, PP currently used in for example capacitor films usually are extra electric insulation grade of PP with a lower melting flow index, thus it is not suitable to be co-extruded with other widely used co-extruded materials having a high melting flow index, such as polyamide and PET. Thus, in the prior art, this grade PP is not used in co-extrusion process.

However, in the present disclosure, the inventors have created the multi-layered dielectric material from a totally different idea. The layers made of same material will have a better compatibility since the same base material will have a similar melting flow index and they may be compatible very well. Thus, in the present disclosure, it is proposed to multi-layer the same material together. In such a way, it may also benefit from well-known layered structure, such as a reduced statistical probability of having a defect throughout the multi-layered dielectric polymer material. Besides, there might also be a positive in terms of morphology, in particular at interface because the layers in the proposed multi-layered dielectric polymer material are made of similar base material and they will be rather homogenous. Therefore, material compatibility issues between different layers (a quite normal problem for multi-material co-extrusion) may be avoided. At the same time, the proposed multi-layered dielectric polymer material may also have increased dielectric strength and excellent thermal properties.

Figure 2:
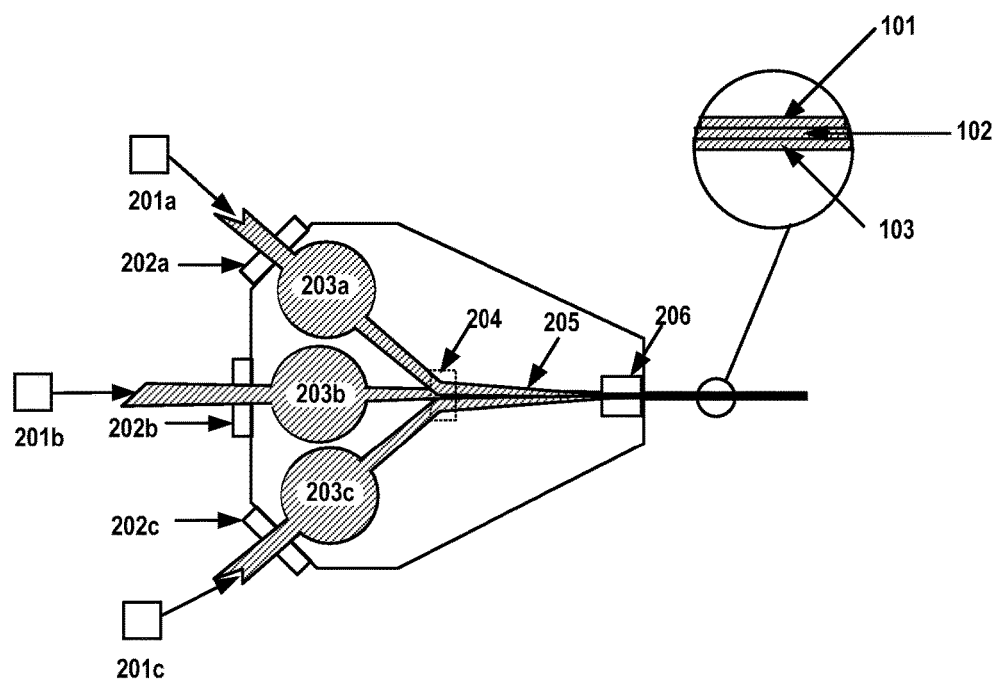
FIG. 2 schematically illustrates a cast co-extrusion system for forming a multi-layered dielectric polymer material according to an embodiment of the present invention.

In the present disclosure, the multi-layered dielectric polymer material may be manufactured by any suitable processes. In an embodiment of the present disclosure, it may be formed by co-extrusion process. It is well know that co-extrusion is a process to feed two or more materials through a single die with two or more orifices arranged so that extrudates can be merged and weld together into a laminar structure before chilling. FIG. 2 illustrates a diagram of a cast co-extrusion system which may be used to co-extrude multi-layered dielectric polymer material of the present disclosure. As illustrated in FIG. 2, the cast co-extrusion system may comprise feedblocks 203a to 203b, an adapter 204, and a die 205. The feedblocks 203a to 204c are received material flows from extruders 201a to 201c from orifices 202a to 202c respectively. The adaptor 204 is the bridge between the feedblocks 203a to 203c and the die 205. The adaptor 204 is designed to collect various melt material flows from the feedblocks 203a to 203c into the die. Inside the die, the melt material flows will flow smoothly and are output at the die head 206. Then it may form the multi-layered dielectric polymer that comprise a plurality of layers 101 to 103

Co-extrusion can be employed in film blowing, free film extrusion, and extrusion coating processes. The advantage of co-extrusion is that each ply of the multi-layered imparts a desired characteristic property, such as stiffness, heat-sealability, impermeability or resistance to some environment, all of which properties would be impossible to attain with any single material. However, in the present disclosure, the base materials for all the layer are exactly same.

Hereinafter, description will be made to a formation process of the multi-layered dielectric polymer material.

By means of the cast co-extrusion system, the exact same base materials may be fed from the extruders 201a to 201c through the plurality of orifices 202a to 202c into feed block 203a to 203c respectively. Afterwards, the melt material flows will enters into the die 205 through the adapter 204, then the layered material flows may be merged and weld together into a laminar sheet in the die before chilling. The coextruded laminar sheets may have a thickness of about 100 microns up to tens of millimeters. It should be noted that the overall shape of the co-extruded material is not limited to laminar sheets. Other shapes, such as tubes, cylinders, and so on, are also possible to be prepared through the same process. After that, the coextruded laminar sheets may be further bi-axially stretched into thin films with a thickness of about 1 to 50 microns, by using for example a bubble blown stretching machine, or a tender frame stretching machine, or a laboratory stretching machine (e.g., KARO IV, Brückner). The stretching mode at machine direction (MD) and transverse direction (TD) can be either a simultaneous stretching mode or a sequential stretching mode.

To further improve the dielectric strength of the multi-layered dielectric polymer material, the base material may be compounded with nucleating agents (NA) or at least one of the plurality of dielectric layers and preferably, the base material for all of the plurality of dielectric layers may be compounded with NA. Thus, in such a case, the material may be first compounded with NA by a twin-screw extruder before being fed to the die.

The base material may be compounded with the exact same NA and it may also be compounded with different nucleating agents respectively for at least two of the plurality of dielectric layers, or for all of the plurality of dielectric layers. Besides, nucleating agents compounded with the base material may have different contents of nucleating agents respectively for at least two of the plurality of dielectric layers or for all of the plurality of dielectric layers. In embodiments of the present disclosure, the total amount of the nucleating agent is from about 0.14 wt % to about 5.0 wt % based on the total weight of the multi-layered dielectric polymer material. Preferably the total amount of the nucleating agent may be ranging from about 0.40 wt % to about 3.0 wt % and most preferably from about 0.5 wt % to about 1.0 wt %.

Besides, as an example, for the polypropylene as the base polymer, it may obtain excellent dielectric breakdown properties through modification of morphology of the polymer by simultaneously using two types of nucleating agents: α-nucleating agent and β-nucleating agent. As an example, the polypropylene may be compounded with a combination of both α-nucleating agent and β-nucleating agent, wherein the total amount of the α-nucleating agent and β-nucleating agent is from about 0.14 wt % to about 5.0 wt %, preferably about 0.40 wt % to about 3.0 wt % and most preferably about 0.5 wt % to about 1.0 wt %, based on the total weight of the dominated dielectric polymer material. Besides, the weight ratio of the α-nucleating agent to the β-nucleating agent may be ranging from about 4:1 to about 1:4, preferably from about 3:1 to about 1:3 and most preferably about 3:2 to about 2:3.

According to one embodiment of the present invention, the amount of the polypropylene present in the proposed multi-layered dielectric polymer material is ranging from about 50 wt % to about 99.65 wt %, preferably about 70 wt % to about 99.5 wt % and most preferably about 85 wt % to about 99.5 wt %, based on the total weight of the multi-layered dielectric polymer material. According to another embodiment of the present invention, the polypropylene in the multi-layered dielectric polymer material has a melting index of at least about 0.2 g/10 min and preferably at least about 1.0 g/10 min.

The α-nucleating agent in the multi-layered dielectric polymer material may be compatible with the polypropylene and well dispersed therein. Suitable α-nucleating agents that can be used in the present invention may include, but not limited to: (1) sorbitol derivatives; (2) organic phosphate derivatives; (3) organic carboxylic acid salt compounds. Typical sorbitol derivatives are dibenzylidene sorbitol-based organic compounds. Representative examples include 1,3:2,4-dibenzylidene sorbitol (DBS, typical commercial product name: Millad 3905), 1,3:2,4-bis-(p-methylbenzylidene) sorbitol (MDBS, typical commercial product name: Millad 3940), 1,3:2,4-bis-(p-ethylbenzylidene)sorbitol (EDBS, typical commercial product name: NC-4), 1,3:2,4-bis-(3,4-dimethylbenzylidene)sorbitol (DMDBS, typical commercial product name: Millad 3988), and bis-(4-propylbenzylidene) propyl sorbitol (typical commercial product name: Millad NX8000), etc. Typical organic phosphate and its derivatives include sodium 2,2-methylene-bis-(4,6-ditert-butylphenyl) phosphate (typical commercial product name: ADK NA-11), and aluminum salt of 2,2-methylene-bis-(4,6-di-tert-butylphenyl) phosphate (typical commercial product name: ADK NA-21), etc. Typical organic carboxylic acid salts include sodium benzoate and salts of dehydroabietic acid. Representative examples include bicyclo[2,2,1]-heptane dicarboxylate salt (typical commercial product name: HPN-68) and other compounds. Preferably, sorbitol derivatives are used as the α-nucleating agent in the present invention.

In addition, the β-nucleating agent in the multi-layered dielectric polymer material may also be compatible with the polypropylene resin and well dispersed therein. Suitable β-nucleating agents that can be used in the present invention include but not limited to: (1) organic pigments; (2) aromatic amide compounds; (3) group HA metal salt compounds. Typical commercial organic pigments include γ-modification of linear trans-quinacridone (γ-TLQ, typical commercial trade name: Permanentrot E3B). Typical aromatic amide compounds include N,N'-dicyclohexyl-2,6-naphthalenedicarboxamide (typical commercial trade name: NJStar NU-100), N,N-dicyclohexyl-terephthalamide (typical commercial trade name: NABW), and aryl amide-based organic compounds (typical commercial trade name: TMB-5), etc. Typical group HA metal salts mainly include calcium salts of imido acids and compounds of calcium stearate and pimelic acid. Preferably, aromatic amide compounds are used as the β-nucleating agent in the present invention.

According to one embodiment of the present invention, the multi-layered dielectric polymer material comprises combined nucleating agents of both α-nucleating agent and β-nucleating agent, wherein the α-nucleating agent is contained in an amount of from 0.07 wt % to 4.0 wt %, preferably 0.1 wt % to 2.4 wt % and most preferably 0.2 wt % to 0.6 wt %, based on the total weight of the multi-layered dielectric polymer material According to another embodiment of the present invention, the β-nucleating agent is comprised in the multi-layered dielectric polymer material in an amount of from 0.07 wt % to 4.0 wt %, preferably 0.1 wt % to 2.4 wt % and most preferably 0.2 wt % to 0.6 wt %, based on the total weight of the multi-layered dielectric polymer material. Preferably, the α-nucleating agent is present in an amount higher than the β-nucleating agent.

Besides, the multi-layered dielectric polymer material as proposed in the present disclosure may be made in a form of thin film, for using in capacitors, such impregnated capacitors. However, the present disclosure is not limited thereto. Actually, statistical advantageous are equally well valid for thicker multi-layered dielectric polymer material for using in for example High-Voltage cables. Besides, it may also be used in any other electric equipment such as power bushings, and it may also used in any other suitable applications such as packaging.

In an embodiment of the present disclosure, the multi-layered dielectric polymer material may have an average breakdown strength of at least about 540 V/μm, preferably at least about 590 V/μm. Besides, the proposed dielectric polymer material may have an average thickness ranging from about 1 μm to 20 cm. For the multi-layered dielectric polymer material in a form of a dielectric polymer film, the dielectric polymer film may have an average thickness ranging from about 1 to 30 μm, and preferably about 3 to 20 μm.

Besides, it should be noted that although the embodiments are described to have three dielectric layers but the present disclosure is not limited thereto. In practice, it may form the multi-layered dielectric polymer material of any number of layers, for example, 2 layers, 4 layers, 5 layers, 6 layer, 7 layers and so on.

Besides, although PP is taken as a base material of the multi-layered dielectric polymer material, similar process may also be applied to any other dielectric materials such as polyethylene (PE), crosslinked polyethylene (PEX), polyethylene terephthalate (PET), and polycarbonate (PC), polyethylene naphthalate (PEN), polyphenylene sulfide (PPS), polytetrafluoroethylene (PTFE), polyvinylidene difluoride (PVDF), polyamide (PA), polyimide (PI), polyetherimide (PEI), polyvinyl chloride (PVC), polystyrene (PS), cyanoethyl pullulan, cyanoethyl polyvinylalchohol, cyanoethyl hydroxyethyl cellulose, cyanoethyl cellulose, copolymers thereof, or composites thereof.

Besides nucleating agents, the base material may be compound with other additives and/or fillers to improve dielectric properties. Examples of additives include plasticizers, stabilizers, and compatibilizers. Examples of fillers include short cut fibers, ceramic oxide particles, metal oxide particles, hydroxide particles, and layered mineral silicates.

Hereinafter, the cast co-extrusion process is described as an example of forming the proposed multi-layered dielectric polymer material, but it should be understood that the blowing co-extrusion process may also be used in forming the proposed multi-layered dielectric polymer material. Moreover, in addition to the co-extrusion process, the proposed multi-layered dielectric polymer material may also be made by means of other suitable process such as hot pressing and lamination.

Hereinafter, examples of the multi-layered dielectric polymer material will be described to examine the synergistic effect of the multi-layered dielectric polymer material as proposed in the present disclosure.

EXAMPLES

1. Characterization Methods 1.1 DC Dielectric Breakdown Strength

Dielectric breakdown strength measurements were performed on the bi-axially oriented polypropylene (BOPP) films. A conventional Weibull distribution was used to analyze the breakdown data of polypropylene film samples. The cumulative distribution function of the electrical failure is given by the following formula:

$$F(x) = 1 - e^{-\left(\frac{x-c}{a}\right)^\beta} \tag{1}$$

wherein F(x) is the distribution function of electrical failure; a (scale parameter) is the breakdown strength at the cumulative failure probability of 63.2%; β is the shape parameter of the Weibull distribution, which is a measure of the scatter or the width of the distribution. A high β-value is related to a small scatter of the data. The parameter c, the location parameter, is set to zero. The parameter e is the natural logarithm.

1.2 Thermal Characteristics Analysis

Melting temperature (Tm) of the BOPP films were measured by using a differential scanning calorimetry (DSC). DSC measurement (5-10 mg sample) was carried out according to ISO 3146, part 3 method C2 with a heat ramp. The scan rate was 10° C./min with the temperature ranging from 40 to 220° C.

2. Specific Examples 2.1 Example 1

Example 1 relates to the multi-layered dielectric polymer film of BOPP. To obtain the multi-layered dielectric polymer film of BOPP, one exact same material, polypropylene are fed from three orifices into the die. The three layered PP flows are then merged and weld together into a laminar sheet before chilling. The coextruded laminar sheets were further stretched into thin films by using a laboratory stretching machine (KARO IV, Brückner). Next, the coextruded films were stretched to drawing ratio of 4×4 (machine direction and transverse direction) with a simultaneous stretching mode.

Breakdown tests were performed on BOPP films in the air with a voltage ramp of 500 V/s. The bottom (GND) electrode was composed of a steel plate; the top electrode was made of aluminum (Al) foil. A PET film with a thickness of 30-μm was placed between the aluminum foil and film samples. In addition, there is a circular hole with the area: ~2.5 cm² in the PET film, to guarantee the required shape and area of electrodes for the breakdown tests. Table 1 shows the results of breakdown strength of multi-layered BOPP films with one layer and three layers.

TABLE 1

BD strength of BOPP films with one layer and three layers

| Sample | Average film thickness (µm) | Average BD strength (V/µm) | Weibull alpha parameter (V/µm) | Weibull beta parameter |
|---|---|---|---|---|
| 1-layer BOPP | 20.0 ± 1.9 | 454 | 476 | 11 |
| 3-layer BOPP | 19.6 ± 2.4 | 547 | 567 | 14 |

From the figure and the table, it is clear that the BD strength of 3-layer PP films is much higher than that of single layer BOPP films under the same conditions, which is possibly due to the smaller crystallize sizes in the multi-layer structures.

Besides, Table 2 further illustrates the thermal property of the BOPP films with one layer and three layers.

TABLE 2

Thermal property of BOPP films with one layer and three layers

| Sample | $T_m$ |
|---|---|
| 1-layer BOPP | 160.8 |
| 3-layer BOPP | 161.5 |

Thus, compared with single layer BOPP films, both the melting temperature and crystallization temperature of 3-layer BOPP films increase significantly, which means the 3-layer BOPP films can achieve an excellent thermal property.

2.2 Example 2

Example 2 relates to the multi-layered dielectric polymer film of BOPP with NA.

To obtain the multi-layered dielectric polymer film of BOPP with NA, the pure polypropylene pellets were firstly compounded with NA's by a twin-screw extruder. Then the compounded pellets were coextruded into laminar sheets with a thickness of around 350 microns. The coextruded sheets were further stretched into thin films with a thickness of around 20 microns by using a laboratory stretching machine (KARO IV, Brückner). The subsequent stretching used a drawing ratio of 4×4 (machine direction and transverse direction) to further stretch the sheets in a simultaneous stretching mode.

Breakdown tests were performed on the BOPP films also in the air with a voltage ramp of 500 V/s. At the same time, the bottom (GND) electrode was composed of a steel plate; the top electrode was made of aluminum (Al) foil (electrode area: ~2.5 cm$^2$). Table 3 shows the results of breakdown strength of multi-layered BOPP films with NA of one layer and three layers.

TABLE 3

BD strength of BOPP films with NA

| Sample | Average film thickness (µm) | Average BD strength (V/µm) | Weibull alpha parameter (V/µm) | Weibull beta parameter |
|---|---|---|---|---|
| 1-layer BOPP with NA | 19.6 ± 1.8 | 553 | 569 | 16 |
| 3-layer BOPP with NA | 16.7 ± 1.5 | 590 | 606 | 19 |

*NA composition: 0.3 wt % NX8000 + 0.2 wt % TMB-5

As shown in the Table 3, the BD strength increases significantly by adding the NA's (around 20% increase). The BD strength was further improved by co-extruding the film into 3-layer multi-layered films (around further 7% increase).

Table 4 further illustrates the thermal property of the BOPP films with one layer and three layers.

TABLE 4

Thermal property of BOPP films with NA and without NA

| Sample | $T_m$ |
|---|---|
| 1-layer BOPP without NA | 160.8 |
| 3-layer BOPP without NA | 161.5 |
| 1-layer BOPP with NA | 162.5 |
| 3-layer BOPP with NA | 162.3 |

It is obvious that compounding with NA' may improve the thermal stability of BOPP films. Furthermore, multi-layering has little impact on thermal properties for BOPP films with NA's.

By far, the present invention has been described with reference to the accompanying drawings through particular preferred embodiments. However, it should be noted that the present invention is not limited to the illustrated and provided particular embodiments. For example, the base material for forming the multi-layered electric polymer is not limited to BOPP, any other suitable material such as PP PE, PET, PEX, PC and etc., may also be used to form the multi-layered electric polymer material. Besides, although the specific process parameters are described in embodiments of the present disclosure, the present disclosure is not limited there to and any other parameters may be used as long as it can achieve multi-layered electric polymer material with improved properties.

Though the present invention has been described with reference to the currently considered embodiments, it should be appreciated that the present invention is not limited the disclosed embodiments. On the contrary, the present invention is intended to cover various modifications and equivalent arrangements falling within in the spirit and scope of the appended claims. The scope of the appended claims is accorded with broadest explanations and covers all such modifications and equivalent structures and functions.

What is claimed is:

1. A multi-layered dielectric polymer material comprising a plurality of dielectric layers, wherein the plurality of dielectric layers comprises an identical base material, and further wherein the base material is compounded with different nucleating agents respectively for at least two of the plurality of dielectric layers.

2. The multi-layered dielectric polymer material according to claim 1, wherein the plurality of dielectric layers are coextruded.

3. The multi-layered dielectric polymer material according to claim 1, wherein the base material comprises any one of polypropylene (PP), polyethylene (PE), crosslinked polyethylene (PEX), polyethylene terephthalate (PET), and polycarbonate (PC), polyethylene naphthalate (PEN), polyphenylene sulfide (PPS), polytetrafluoroethylene (PTFE), polyvinylidene difluoride (PVDF), polyamide (PA), polyimide (PI), polyetherimide (PEI), polyvinyl chloride (PVC), polystyrene (PS), cyanoresins, copolymers thereof, or combination thereof.

4. The multi-layered dielectric polymer material according to claim 1, wherein the multi-layered dielectric polymer material has an average breakdown strength of at least about 540 V/μm.

5. The multi-layered dielectric polymer material according to claim 1, wherein the dielectric polymer material has an average thickness ranging from about 1 μm to 20 cm.

6. The multi-layered dielectric polymer material according to claim 1, wherein the multi-layered dielectric polymer material is in a form of a dielectric polymer film.

7. The multi-layered dielectric polymer material according to claim 6, wherein the dielectric polymer film has an average thickness ranging from about 1 to 30 μm.

8. The multi-layered dielectric polymer material according to claim 1, formed into a capacitor, including
a capacitor film composed of the multi-layered dielectric polymer material.

9. The multi-layered dielectric polymer material according to claim 1, wherein the total amount of the nucleating agents is from about 0.14 wt % to about 5.0 wt %, based on the total weight of the multi-layered dielectric polymer material.

10. A multi-layered dielectric polymer material comprising a plurality of dielectric layers, wherein the plurality of dielectric layers comprises an identical base material, and further wherein the base material is compounded with different contents of nucleating agents respectively for at least two of the plurality of dielectric layers.

11. The multi-layered dielectric polymer material according to claim 10, wherein the total amount of the nucleating agents is from about 0.14 wt % to about 5.0 wt %, based on the total weight of the multi-layered dielectric polymer material.

12. The multi-layered dielectric polymer material according to claim 11, wherein at least one of the nucleating agents comprises α-nucleating agent and/or β-nucleating agent.

13. The multi-layered dielectric polymer material according to claim 11, wherein at least one of the nucleating agents comprises α-nucleating agent and/or β-nucleating agent.

14. A method for forming a multi-layered dielectric polymer material comprising:
feeding an identical base material from a plurality of orifices into a die for co-extrusion; and
co-extruding the base material into a laminar sheet, wherein the laminar sheet comprises a plurality of dielectric layers of the identical base material, wherein the base material is compounded with different nucleating agents respectively for at least two of the plurality of dielectric layers.

15. The method according to claim 14, wherein the multi-layered dielectric polymer material has an average breakdown strength of at least about 540 V/μm.

16. The method of claim 14, further comprising:
using the multi-layered dielectric polymer material in electric equipment including capacitors, power bushings, and/or power cables.

17. The method according to claim 14, further comprising:
stretching the coextruded laminar sheet into a thin film; and
stretching the thin film in both a machine direction and a transverse direction in a simultaneous stretching mode or a sequential stretching mode.

18. A method for forming a multi-layered dielectric polymer material comprising:
feeding an identical base material from a plurality of orifices into a die for co-extrusion; and
co-extruding the base material into a laminar sheet, wherein the laminar sheet comprises a plurality of dielectric layers of the identical base material, wherein the base material is compounded with different contents of nucleating agents respectively for at least two of the plurality of dielectric layers.

* * * * *